United States Patent

[11] 3,619,760

[72] Inventors Digjut Singh;
Eugene S. Lysak, both of Waltham, Mass.
[21] Appl. No. 37,666
[22] Filed May 15, 1970
[45] Patented Nov. 9, 1971
[73] Assignee Bell & Howell Communications Company
Waltham, Mass.

[54] ELECTRONIC WAVE FREQUENCY MULTIPLIER WITH VARACTORS HAVING GAMMA ABOUT 0.56
10 Claims, 2 Drawing Figs.

[52] U.S. Cl. .......... 321/69 NL, 330/4.9
[51] Int. Cl. .......... H02m 5/20
[50] Field of Search .......... 321/69 NL, 69 W; 330/4.9

[56] References Cited

UNITED STATES PATENTS

| | | | |
|---|---|---|---|
| 3,076,133 | 1/1963 | Holcomb | 321/69 NL |
| 3,271,656 | 9/1966 | Hines | 321/69 NL |
| 3,311,811 | 3/1967 | Rupp | 321/69 NL |

OTHER REFERENCES

Varactor Handbook by Sylvania; Received by Patent Office Aug. 7, 1967; Copy in Group 210 in Class 321/69 NL; Pages 3 and 4 relied upon

*Primary Examiner*—Gerald Goldberg
*Attorney*—Rosen & Steinhilper

ABSTRACT: A pair of varactors connected antiparallel across a source of fundamental frequency power to provide third harmonic power with essentially suppressed even harmonics minimizes the fifth harmonic with varactors having gamma about 0.56.

INVENTORS
DIGJIT SINGH
EUGENE S. LYSAK
BY ROSEN & STEINHILPER
ATTORNEYS

ELECTRONIC WAVE FREQUENCY MULTIPLIER WITH VARACTORS HAVING GAMMA ABOUT 0.56

DESCRIPTION OF THE INVENTION

This invention relates to electronic wave frequency multipliers and is concerned in particular with a frequency tripler in which the fifth harmonic is substantially minimized relative to the third harmonic.

In communications equipment, for example radio transmitters, frequency multipliers are useful to allow the use of low-frequency generators for relatively higher frequency communications bands. An instance is the use of a fundamental frequency generator at about 150 mHz for communication at about 450 mHz. The electrical and electronic components which are available to generate electric wave energy at the lower frequency would work much less efficiently in a generator tuned to the higher frequency.

Harmonic frequency multipliers tend to generate frequencies other than the desired harmonic, and the various harmonic frequencies occur at power levels which are a fraction of the power level of the fundamental frequency. It is known to provide circuits to minimize even harmonics.

Such a circuit is exemplified in an article entitled "Efficient Frequency Multiplication by Odd Factors without Idlers" appearing in "Electronics Letters" published by the Institution of Electrical Engineers of England, Vol. 4, No. 24, dated Nov. 29, 1968, pages 544 to 545, being a letter dated 29th Oct. 1968 from J. Fikart of the Institute of Radio Engineering and Electronics, Prague, Czechoslovakia.

As reference to the Fikart article will show, two varactors can be connected antiparallel as a means of idlerless frequency multiplication by odd factors. The Fikart circuit, however, requires eight tuning adjustments and as far as can be seen from the article, both the third and fifth harmonics are available and proportionally they are related to each other as closely as 75 percent and 40 percent, respectively.

Figure 1:
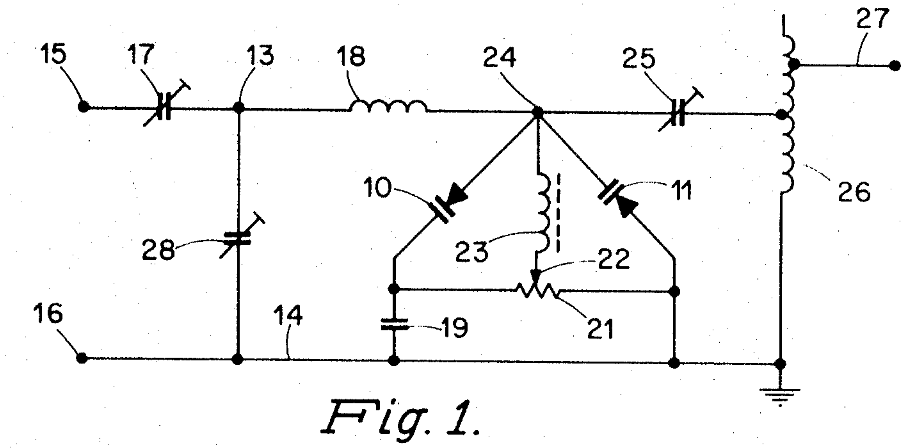
Figure 2:
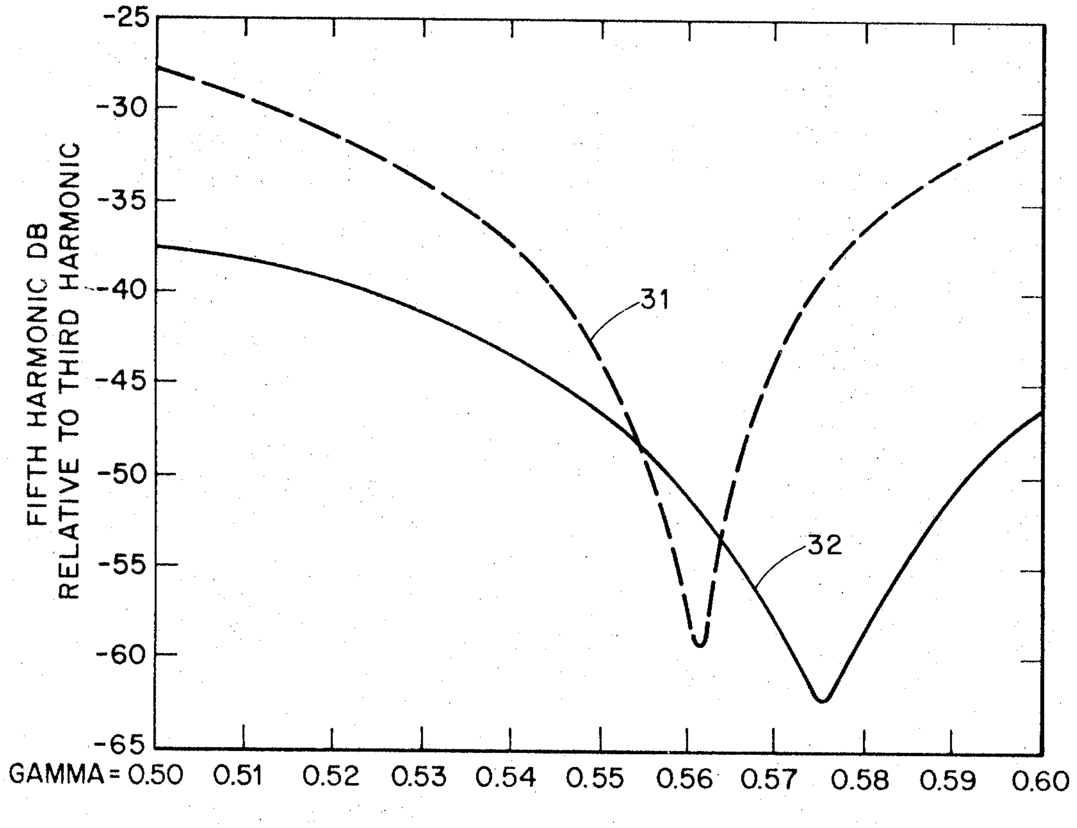

The present invention substantially reduces the fifth and higher harmonics relative to the third, and drastically reduces the number of tuning adjustments required. The invention will be more readily understood from the following description which refers to the accompanying drawings, in which:

FIG. 1 is a circuit diagram showing a frequency tripler according to the invention; and FIG. 2 is a graphic illustration of reduction of the fifth harmonic relative to the third harmonic.

In FIG. 1, a pair of voltage variable capacitance semiconductors, commonly called "varactors," 10 and 11 are connected in antiparallel across lines 13 and 14. Input terminals 15 and 16 are coupled to the varactors, the first 15 being coupled through a variable capacitor 17 in a series with an inductor 18. The remaining terminal 16, which may be used as a ground terminal, is coupled directly to the anode of the second varactor 11 and via a capacitor 19 to the cathode of the first varactor 10. A variable capacitor 28 is coupled across the lines 13 and 14, joining the first line 13 at the junction between the variable capacitor 17 and the inductor 18. A resistor 21, which is part of a potentiometer having a moveable tap 22, is connected from the cathode of the first varactor 10 to the anode of the second varactor 11, and an inductor 23 which functions as an RF choke is connected between the moveable tap 22 and a common junction 24 between the varactors 10 and 11.

The output side of the circuit is connected via a variable capacitor 25 across an autotransformer 26 having an output tap 27 through which the output impedance is adjusted.

The circuit of FIG. 1 bears a general resemblance to the circuit illustrated in the Fikart article, but with substantial and significant differences. Foremost is the fact that in the present invention there are only three tuning adjustments, namely, the variable capacitors 17, 28 and 25. The adjustment of moveable tap 22 on potentiometer resistor 21 serves to balance the bias on the varactors 10 and 11 so as to establish like magnitudes of capacitance in them in the quiescent state, and thereby enhance reduction of even harmonic frequencies. In this instance, the varactors are shown to be self-biasing via the capacitor 19, but it will be understood that an external bias source could be used if desired.

The simplification of this multiplier circuit and consequent increase in its reliability and reduction in its cost is achieved mainly by providing in the combination varactors which have a gamma in excess of 0.5. In other words, contrary to common belief, varactors obeying the inverse square law should not be preferred. Reference is directed to *Microwave Engineering* by A. F. Harvey, published by Academic Press, New York, 1963, particularly pages 834 and 835, which describe the well-known capacitance-applied bias voltage characteristics for abrupt junction and graded junction diodes. FIG. 2 illustrates the unexpected discovery that the fifth harmonic is minimized relative to the third harmonic when the varactors have gamma in the range around 0.56 to 0.58. Curve 31, taken at a peak voltage of 3.74 on a varactor back biased at 3.25 volts with a contact potential of 0.5 volts, illustrates fifth harmonic down nearly 60 db. relative to third harmonic at about gamma equal to 0.563. Curve 32, taken at peak voltage of 3.0, all other stated conditions being the same, illustrates the fifth harmonic down about 65 db. at a value of gamma equal to 0.575. These curves are exemplary only. They illustrate also that it would not be productive of further reduction in fifth harmonic relative to third merely to increase gamma indefinitely.

At about the same value of gamma, the seventh harmonic also becomes minimum in power relative to the third harmonic. This does not happen at precisely the same value of gamma for each of the fifth and seventh harmonics, but it does happen at values of gamma close enough so that, in practice, it is possible to employ varactors having a value of gamma which enables the individual fifth and seventh harmonics to be brought close to their minimum values of power relative to the third harmonic. In the present invention, the value of gamma at which the fifth and seventh harmonics are minimized relative to the third harmonic is found to be only slightly dependent on drive level, and it was found to move toward 0.57 (from 0.56 approximately) for lower driving levels of the input wave form.

The result of this discovery is that the multiplier circuit of the invention can be built in practice with simplified input and output filtering and it is a consequence of this fact that a circuit according to the present invention may have only three tuning adjustments rather than eight as in the prior art. Moreover, power available for the desired third harmonic frequency is increased.

We claim:

1. In an electric circuit for generating an electric wave at an odd-harmonic frequency of a given fundamental frequency input wave and for substantially suppressing waves at even-harmonic frequencies of said input wave, said circuit comprising input circuit means for said input wave, first and second voltage-variable impedance means each having an impedance characteristic which varies nonlinearly with respect to the magnitude of unidirectional biasing voltage applied in a prescribed direction across it in accordance with the relation $$Z\alpha\frac{1}{(K+V)^{\gamma}}$$

where $Z$ impedance; $V$ = *biasing voltage;* $K$ a constant of the impedance means; and $\gamma$ = the power law of the impedance means; said characteristics being substantially similar over a given range of biasing voltage magnitudes between zero and a finite voltage value, means coupling said impedance means in parallel across said input means with said prescribed directions oppositely oriented, so that, instantaneously, the voltage of said input wave, when applied thereto, will be in said prescribed direction in one while opposite to said prescribed direction in the other, means to engender in each of said impedance means a biasing voltage having a magnitude in the intermediate region of said range such that said impedance means have substantially like magnitudes of said impedance in the quiescent state, and output circuit means tuned substantially to the third harmonic of said fundamental frequency coupled across said impedance means in parallel; the improvement that said impedance means each has $\gamma$ in a range approximately 0.56 to 0.58, such that the fifth harmonic of said input wave is substantially minimized relative to the third harmonic thereof.

2. An electric circuit according to claim 1 in which said impedance means are semiconductor varactor diodes each having a capacitance characteristic under reverse-bias which varies inversely with the applied bias voltage according to said relation and said biasing voltage engendering means is arranged to apply reverse-bias to said diodes.

3. An electric circuit according to claim 2 in which said diodes are of the abrupt PN junction type in which said capacitance varies inversely with the applied voltage according to approximately the 0.56 to 0.58 power.

4. A circuit according to claim 3 in which said diodes are connected across said input circuit in parallel for said waves, one side of one of said diodes being coupled through a capacitor to said input circuit and thereby isolated therefrom for DC, whereby said bias voltage may be applied to said diodes in a series loop in which said diodes are oriented in the same direction.

5. A circuit according to claim 4 in which a reactive path is connected across said input circuit in parallel with said diodes.

6. An electric wave frequency tripler comprising an input circuit for a fundamental frequency wave, connected antiparallel across said input circuit a pair of voltage-variable capacitance semiconductor diodes having gamma in the range about 0.56 to 0.58, and an output circuit for the third harmonic of said fundamental frequency wave.

7. A tripler according to claim 6 having only three tuning adjustments, namely, variable capacitor means in series in each of said input and output circuits and shunt variable capacitor means in one of said circuits.

8. A tripler according to claim 6 including means to engender in said diodes back-bias potentials to establish substantially like capacitance values in them in the quiescent state.

9. A tripler according to claim 6 in which said diodes are of the abrupt PN-junction type.

10. A tripler according to claim 6 in which the anode of one of said diodes is connected to the cathode of the other at a junction common with one side of each of said input and output circuits, a resistor is connected from the remaining anode to the remaining cathode, and an inductor is connected from said common junction to a midpoint of said resistor.

* * * * *